United States Patent
Sugawara et al.

(10) Patent No.: US 10,634,904 B2
(45) Date of Patent: Apr. 28, 2020

(54) IMAGE PROJECTION DEVICE

(71) Applicant: QD LASER, INC., Kawasaki-shi (JP)

(72) Inventors: Mitsuru Sugawara, Kawasaki (JP); Makoto Suzuki, Kawasaki (JP); Michio Arai, Kawasaki (JP)

(73) Assignee: QD LASER, INC., Kawasaki-shi (JP)

( * ) Notice: Subject to any disclaimer, the term of this patent is extended or adjusted under 35 U.S.C. 154(b) by 0 days.

(21) Appl. No.: 16/062,384

(22) PCT Filed: Nov. 28, 2016

(86) PCT No.: PCT/JP2016/085121
§ 371 (c)(1),
(2) Date: Jun. 14, 2018

(87) PCT Pub. No.: WO2017/110370
PCT Pub. Date: Jun. 29, 2017

(65) Prior Publication Data
US 2018/0373024 A1    Dec. 27, 2018

(30) Foreign Application Priority Data
Dec. 22, 2015 (JP) ................................. 2015-250285

(51) Int. Cl.
*G02B 26/10* (2006.01)
*G02B 27/02* (2006.01)
(Continued)

(52) U.S. Cl.
CPC ............ *G02B 26/10* (2013.01); *G02B 27/02* (2013.01); *G09G 3/025* (2013.01); *G09G 3/346* (2013.01);
(Continued)

(58) Field of Classification Search
CPC ......... G06F 3/013; G06F 1/163; G09G 3/346; G09G 3/025
See application file for complete search history.

(56) References Cited

U.S. PATENT DOCUMENTS 5,742,264 A    4/1998 Inagaki
6,011,526 A    1/2000 Toyoshima
(Continued)

FOREIGN PATENT DOCUMENTS

JP    H7-95498 A    4/1995
JP    H8-292394 A    11/1996
(Continued)

OTHER PUBLICATIONS

Office Action for corresponding Japanese Patent Application No. 2015-250285 dated Aug. 1, 2017 (4 Sheets, 3 Sheets translation, 7 Sheets total).
(Continued)

*Primary Examiner* — Gerald Johnson
(74) *Attorney, Agent, or Firm* — Kratz, Quintos & Hanson, LLP

(57) ABSTRACT

An image projection device includes: a projection unit that irradiates a pupil 40 of an eyeball 36 of a user with an image light beam 34a forming an image to project the image onto a retina 38 of the eyeball; a detection unit that detects a direction 52 in which the pupil has moved relative to a face of the user; and a control unit that controls the projection unit based on a detected direction in which the pupil has moved so that the pupil is irradiated with the image light beam and the image is moved in a direction opposite to the direction in which the pupil has moved with respect to a position on which the image has been projected before a move of the pupil in a coordinate system visually recognized by the user.

11 Claims, 16 Drawing Sheets

(51) Int. Cl.
*H04N 5/64* (2006.01)
*G09G 3/02* (2006.01)
*G09G 3/34* (2006.01)

(52) U.S. Cl.
CPC ......... *H04N 5/64* (2013.01); *G09G 2320/028* (2013.01); *G09G 2320/0261* (2013.01); *G09G 2354/00* (2013.01)

(56) References Cited

U.S. PATENT DOCUMENTS

| | | |
|---|---|---|
| 2007/0159599 A1 | 7/2007 | Yamada |
| 2008/0151185 A1 | 6/2008 | Saito |
| 2008/0212195 A1* | 9/2008 | Yamamoto ......... G02B 27/0093 359/630 |
| 2010/0097580 A1 | 4/2010 | Yamamoto |
| 2013/0278497 A1 | 10/2013 | Takagi |
| 2015/0146028 A1* | 5/2015 | Choi ................. H04N 5/23219 348/211.11 |
| 2016/0103324 A1 | 4/2016 | Arakawa |
| 2017/0102548 A1* | 4/2017 | Tremblay ........... G02B 27/0172 |

FOREIGN PATENT DOCUMENTS

| | | |
|---|---|---|
| JP | H9-284676 A | 10/1997 |
| JP | 2003-29198 A | 1/2003 |
| JP | 2011-75956 A | 4/2011 |
| JP | 2013-225042 A | 10/2013 |
| JP | 2016-14768 A | 1/2016 |
| WO | 2006/19028 A1 | 2/2006 |
| WO | 2014/192479 A1 | 12/2014 |

OTHER PUBLICATIONS

International Search Report for International Application No. PCT/JP2016/085121 dated Feb. 14, 2017 (2 Sheets).

Partial Supplementary European Search Report for European Patent Application No. 16878264.7 dated Sep. 26, 2018 (27 pages).

* cited by examiner

| DETECTION LIGHT BEAM | MOVE DIRECTION | MOVE AMOUNT |
|---|---|---|
| A | AA | aa |
| B | BB | bb |
| ⋮ | ⋮ | ⋮ |

IMAGE PROJECTION DEVICE

TECHNICAL FIELD

The present invention relates to an image projection device, and for example, an image projection device that directly projects an image onto the retina of the user.

BACKGROUND ART

There have been known image projection devices such as head-mounted displays (HMDs) that directly project an image onto the retina of the user by using a light beam emitted from a light source (Patent Document 1). Such image projection devices employ a method called Maxwellian view. In Maxwellian view, the light beam forming an image is made to be converged on the vicinity of the pupil to project the image onto the retina.

It has been known to move the display area when the user moves the face to move the visual line (Patent Document 2). It has been known to adjust the position of the screen in response to the change in posture of the wearer (Patent Document 3). It has been known to perform adjustment so that the image light enters the pupil when the pupil moves (Patent Document 4).

PATENT DOCUMENT

Patent Document 1: International Publication No. 2014/192479
Patent Document 2: Japanese Patent Application Publication No. 7-95498
Patent Document 3: Japanese Patent Application Publication No. 2013-225042
Patent Document 4: Japanese Patent Application Publication No. 2011-75956

SUMMARY OF THE INVENTION

Problem to be Solved by the Invention

If an image is not projected onto the retina when the user moves eyeballs relative to the face, a feeling of strangeness may be brought to the user.

The present invention has been made in view of the above problems, and aims to appropriately project an image onto the retina of the user.

Means for Solving the Problem

The present invention is an image projection device characterized by including: a projection unit that irradiates a pupil of an eyeball of a user with an image light beam forming an image to project the image onto a retina of the eyeball; a detection unit that detects a direction in which the pupil has moved relative to a face of the user; and a control unit that controls the projection unit based on a detected direction in which the pupil has moved so that the pupil is irradiated with the image light beam and the image is moved in a direction opposite to the direction in which the pupil has moved with respect to a position on which the image was projected before a move of the pupil in a coordinate system visually recognized by the user.

In the above configuration, the control unit may be configured to irradiate the pupil with the image light beam by moving a position irradiated with the image light beam in the eyeball in the direction in which the pupil has moved and tilting a direction in which the image light beam enters the eyeball in the direction in which the pupil has moved.

According to the above configuration, the control unit may be configured to control the projection unit so that a position of a visual line of the user in the image visually recognized by the user due to the move of the pupil is located at a position in the retina at which a center position of the image before the move of the pupil is located.

In the above configuration, the projection unit may be configured to include a light source emitting the image light beam, and a scan unit that scans a light beam emitted from the light source and scans the image light beam so that the image is formed in a second area smaller than a first area within which the light beam is able to be scanned, and the control unit may be configured to control the projection unit so that the second area is moved in a direction opposite to a direction corresponding to the direction in which the pupil has moved within the first area.

In the above configuration, the projection unit may be configured to include a mirror that is located in front of the eyeball and reflects the image light beam scanned by the scan unit to the pupil, and the control unit may be configured to control the projection unit so that the second area moves in the direction opposite to the direction corresponding to the direction in which the pupil has moved within the first area in a coordinate system on the mirror.

In the above configuration, the projection unit may be configured to form the image with image data of a second area smaller than a first area in image data of the first area, and the control unit may be configured to control the projection unit so that the second area is moved in a direction corresponding to the direction in which the pupil has moved.

In the above configuration, the projection unit may be configured to emit a detection light beam emitted from a light source, from which the image light beam is also emitted, to a second region distant from a first region irradiated with the image light beam in the eyeball of the user, and the detection unit may be configured to detect the direction in which the pupil has moved relative to the face of the user based on a detection result of a reflected light that is the detection light beam reflected by the eyeball of the user.

In the above configuration, the projection unit may be configured to emit a plurality of detection light beams to positions located away from each other, and the control unit may be configured to have move directions of the image predetermined with respect to the plurality of detection light beams, and to control the projection unit so that the image is moved in a move direction of the image corresponding to a detection light beam not reflected by the eyeball among the plurality of detection light beams.

In the above configuration, the control unit may be configured to have move directions and move amounts predetermined with respect to the plurality of detection light beams, and to control the projection unit so that the image is moved in a move direction of the image corresponding to a detection light beam not reflected by the eyeball among the plurality of detection light beams by a move amount corresponding to the detection light beam not reflected by the eyeball.

Effects of the Invention

The present invention allows an image to be appropriately projected onto the retina of the user.

EMBODIMENTS FOR CARRYING OUT THE INVENTION

Hereinafter, with reference to the accompanying drawings, embodiments of the present invention will be described.

First Embodiment

Figure 1:
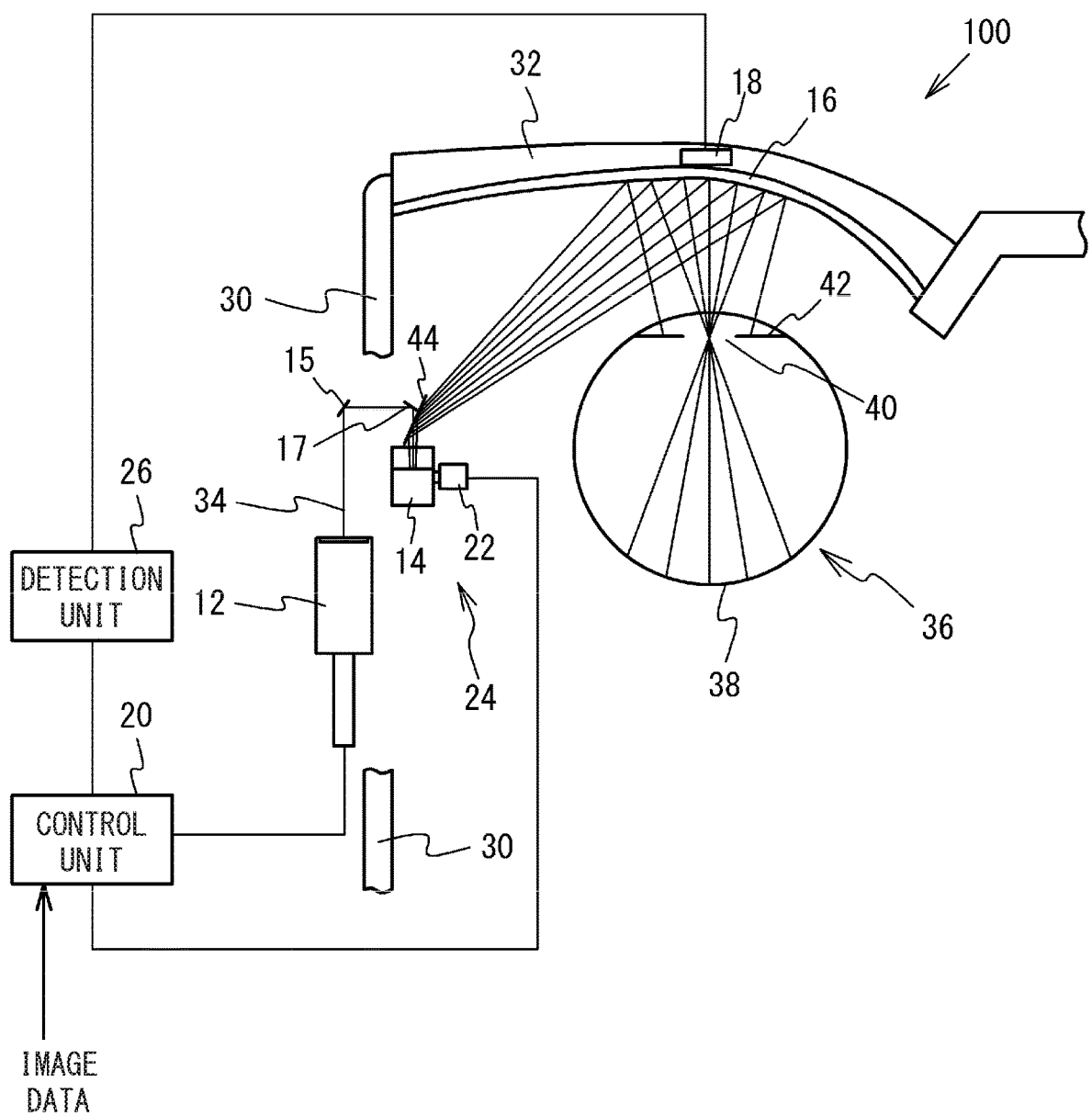
FIG. 1 illustrates an image projection device in accordance with a first embodiment as viewed from above.
Figure 2:
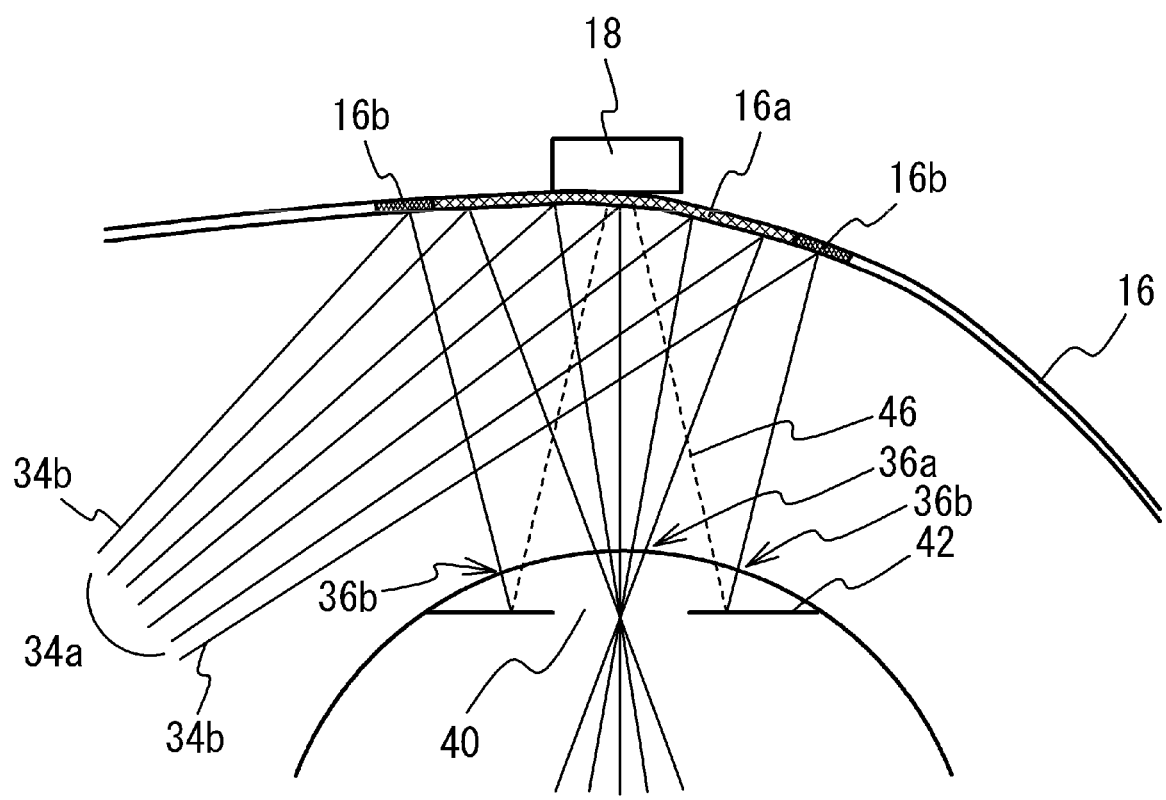
FIG. 2 is an enlarged view of the vicinity of a projection portion in FIG. 1.

FIG. 1 illustrates an image projection device in accordance with a first embodiment as viewed from above. FIG. 2 is an enlarged view of the vicinity of a projection portion in FIG. 1. An image projection device 100 of the first embodiment is a retina projection type head-mounted display that employs Maxwellian view in which an image light beam for causing the user to visually recognize an image is directly projected onto a retina 38 of an eyeball 36 of the user.

The image projection device 100 of the first embodiment includes a light detector 18, a control unit 20, a projection unit 24, and a detection unit 26 as illustrated in FIG. 1. The projection unit 24 includes a light source 12, a first mirror 14, a second mirror 15, a third mirror 17, a fourth mirror 44, a projection portion 16, and a position adjustment unit 22.

The light source 12 is arranged in a temple 30 of a spectacle type frame. The light source 12 emits a light beam 34 of, for example, a single wavelength or a plurality of wavelengths under the instruction of the control unit 20. The light beam 34 includes an image light beam for projecting an image onto the retina 38 of the eyeball 36 of the user, and a detection light beam for detecting at least one of the position of the pupil 40 of the eyeball 36 of the user and the opening and closing of the eyelid of the user. Since the detection light beam is emitted from the light source 12 from which the image light beam is also emitted, the detection light beam is a visible light as well as the image light beam. The light source 12 emits, for example, a red laser light (wavelength: approximately 610 nm to 660 nm), a green laser light (wavelength: approximately 515 nm to 540 nm), and a blue laser light (wavelength: 440 nm to 480 nm). Non-limiting examples of the light source 12 emitting red, green, and blue laser lights include a light source in which respective laser diode chips of RGB (red/green/blue), a three-color synthesis device, and a micro collimating lens are integrated.

The first mirror 14 is arranged in the temple 30 of the spectacle type frame. The first mirror 14 scans the image light beam emitted from the light source 12 in the horizontal direction and the vertical direction. Additionally, the first mirror 14 reflects the detection light beam emitted from the light source 12. The first mirror 14 is, for example, a MEMS (Micro Electro Mechanical System) mirror. The light beam 34 emitted from the light source 12 is reflected by, for example, the second mirror 15 and the third mirror 17 to enter the first mirror 14.

Figure 3A:
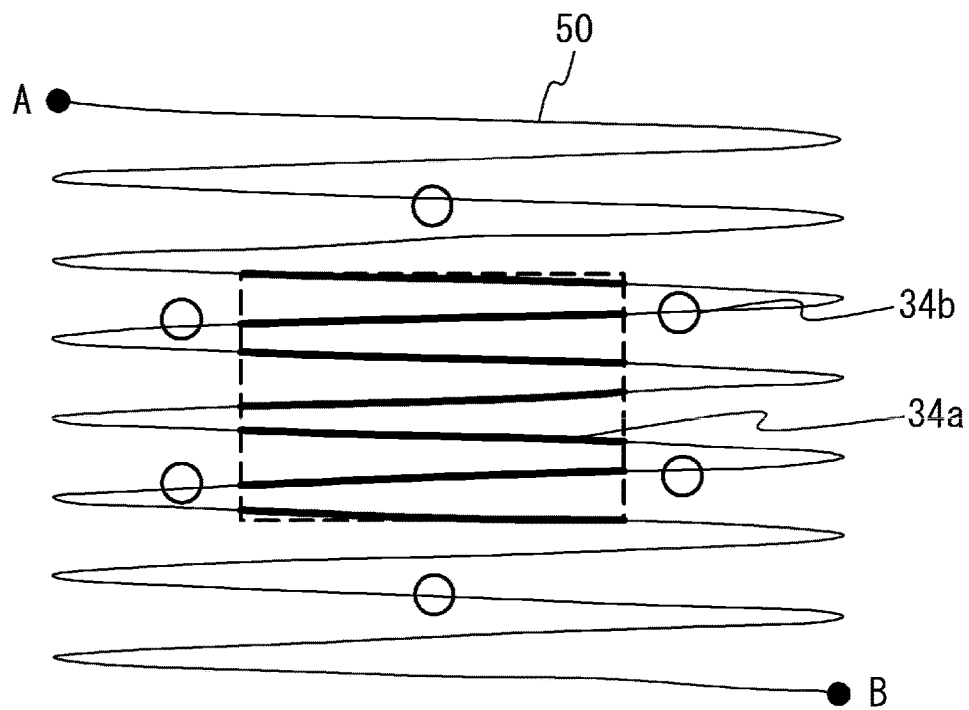
FIG. 3A illustrates the oscillation of a first mirror.

FIG. 3A illustrates the oscillation of the first mirror. The image light beam and the detection light beam will be described. One of the methods for projecting an image onto the retina 38 by scanning the image light beam by the first mirror 14 is a method that displays an image by scanning light at high speed from the upper left to the lower light of the image (for example, raster scan). As illustrated in FIG. 3A, the first mirror 14 oscillates in the horizontal direction (a first direction) and the vertical direction (a second direction intersecting with the first direction) beyond the area of the image projected onto the retina 38 (the area indicated by a dashed line in FIG. 3A) to scan an image light beam 34a. The oscillation of the first mirror 14 is indicated by reference numeral 50.

When an image is projected onto the retina 38 by scanning the image light beam 34a at the points at which the first mirror 14 swings greatly, image distortion is large. Thus, the image light beam 34a is scanned at the points at which the swing of the first mirror 14 is small. On the other hand, the detection light beam 34b enters the first mirror 14 at the timings when the image light beam 34a is not scanned in the oscillation 50 of the first mirror 14. In other words, in the oscillation 50 of the first mirror 14, the light source 12 emits the image light beam 34a to the first mirror 14 in the period corresponding to the area of the image projected onto the retina 38 and emits the detection light beam 34b to the first mirror 14 at time corresponding to the outside of the area of the image.

Figure 3B:
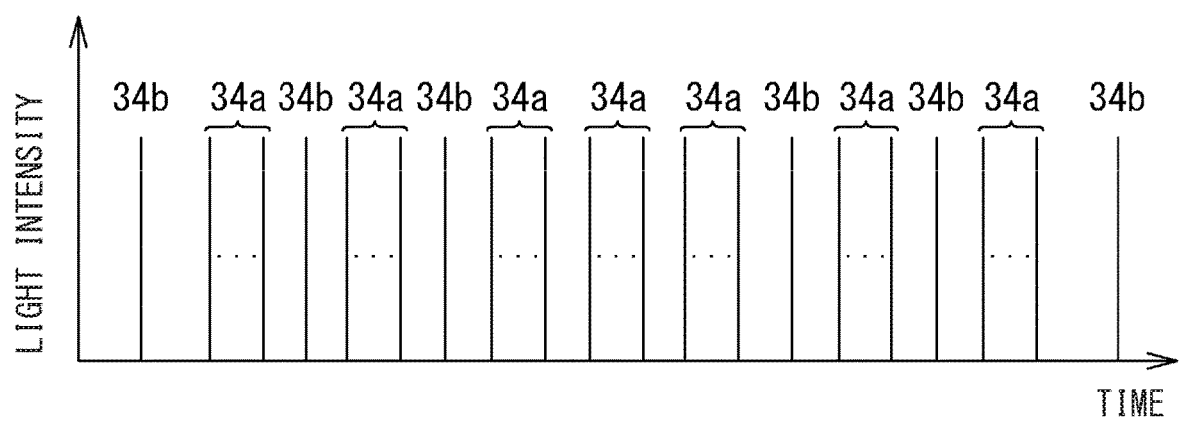
FIG. 3B is a timing chart illustrating emission timings of an image light beam and a detection light beam.

FIG. 3B is a timing chart illustrating emission timings of the image light beam and the detection light beam, and illustrates the emission timings of the image light beam 34a and the detection light beam 34b from the light source 12 when the first mirror 14 oscillates from a point A to a point B in FIG. 3A. The light intensity of the detection light beam 34b may be the same as or different from that of the image light beam 34a. The light intensity of the detection light beam 34b may be any light intensity that allows a reflected light 46 to be detected by the light detector 18.

One or a plurality of the detection light beams 34b enter the first mirror 14. FIG. 3A and FIG. 3B illustrate a case where six detection light beams 34b enter the first mirror 14 as an example. The detection light beam 34b may be a light beam of a single wavelength, and may be a light beam corresponding to one pixel or several pixels of the image projected onto the retina 38. FIG. 3A illustrates a case where the image light beam 34a is scanned in a rectangular shape as an example, but does not intend to suggest any limitation. The image light beam 34a may be scanned in other shapes such as a trapezoidal shape.

As illustrated in FIG. 1 and FIG. 2, the image light beam 34a scanned by the first mirror 14 and the detection light beam 34b reflected by the first mirror 14 are reflected by the fourth mirror 44 toward a lens 32 of the spectacle type frame. Since the projection portion 16 is arranged on the surface closer to the eyeball 36 of the lens 32, the image light beam 34a scanned by the first mirror 14 and the detection light beam 34b reflected by the first mirror 14 enter the projection portion 16. The projection portion 16 is a half mirror that has a free curved surface or a composite structure of a free curved surface and a diffraction surface in a first region 16a where the image light beam 34a is incident. This structure causes the image light beam 34a that has entered the projection portion 16 to converge on the vicinity of the pupil 40 of the eyeball 36 and then be projected onto the retina 38. Accordingly, the user is able to recognize the image formed by the image light beam 34a and visually recognize an external world image through the projection portion 16. On the other hand, the projection portion 16 is a half mirror that has a shape optically discontinuous with the first region 16a in second regions 16b where the detection light beam 34b is incident. Accordingly, the detection light beam 34b is projected onto an iris 42 of the eyeball 36 when the image light beam 34a passes through the pupil 40 to be projected onto the retina 38. As described above, when the surface region of the eyeball 36 onto which the image light beam 34a is projected is defined as a first surface region 36a, the detection light beam 34b is projected onto second surface regions 36b distant from the first surface region 36a of the eyeball 36.

Figure 4:
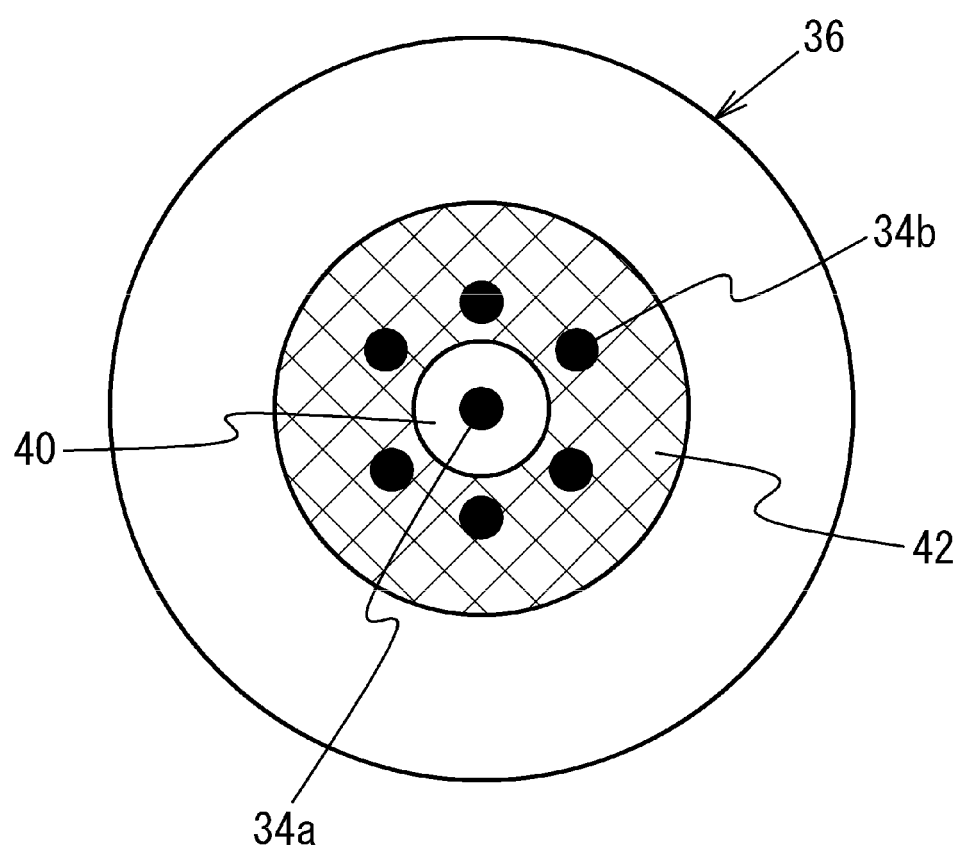
FIG. 4 is a front view of an eyeball illustrating an irradiation position of the detection light beam.

FIG. 4 is a front view of an eyeball illustrating the irradiation position of the detection light beam, and is a diagram for describing projection of the image light beam 34a and the detection light beam 34b onto the eyeball 36. As illustrated in FIG. 4, the detection light beam 34b is projected onto the iris 42 when the image light beam 34a passes through the vicinity of the center of the pupil 40 and is then projected onto the retina 38. Since the second regions 16b of the projection portion 16 are optically discontinuous with the first region 16a, the detection light beam 34b can be projected onto the iris 42 while the image light beam 34a passes through the pupil 40 and is projected onto the retina 38. The image light beam 34a and the detection light beam 34b are emitted from the light source 12 at predetermined timings with respect to the oscillation of the first mirror 14. That is, the relative emission timings of the image light beam 34a and the detection light beam 34b are fixed. Thus, the image light beam 34a and the detection light beam 34b are projected onto the eyeball 36 while the relative positional relation between the image light beam 34a and the detection light beam 34b is fixed. Additionally, as illustrated in FIG. 3A, since a plurality of the detection light beams 34b are lights reflected at different positions of the oscillation 50 of the first mirror 14, the detection light beams 34b are projected onto the different positions of the iris 42 at different times (different timings). That is, a plurality of the detection light beams 34b are sequentially projected onto different positions of the iris 42.

Figure 5:
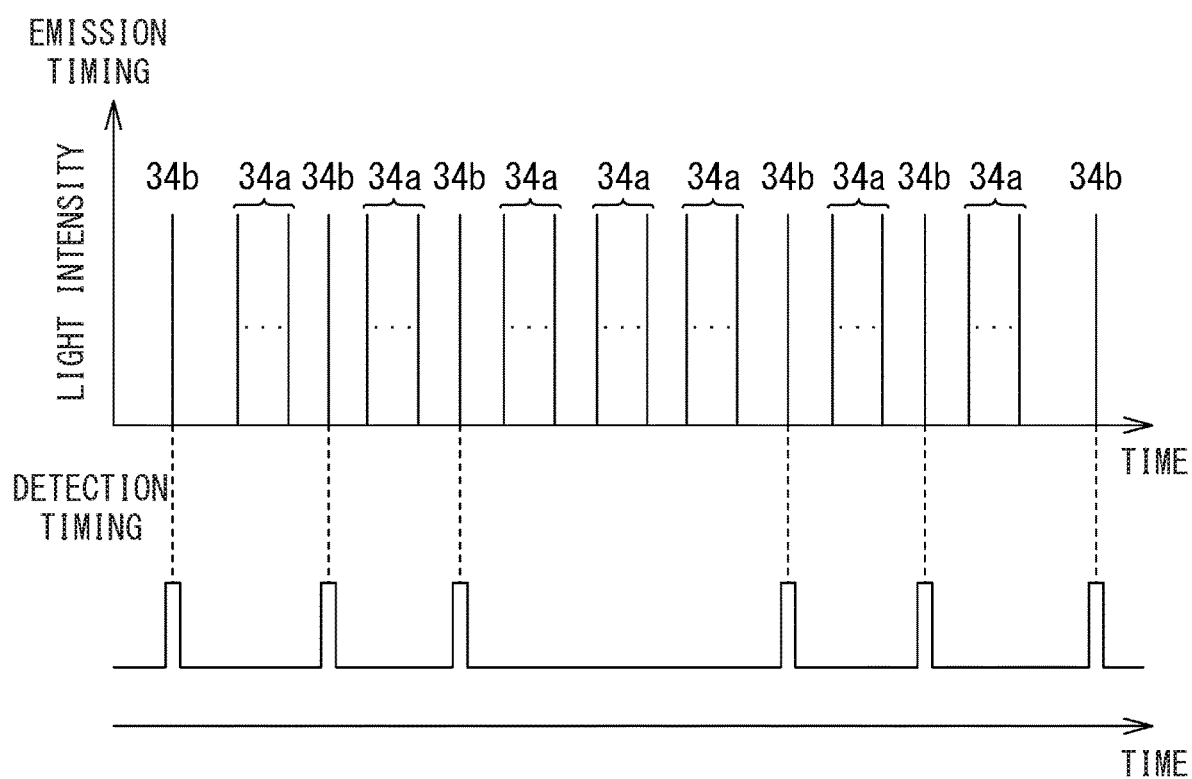
FIG. 5 is a timing chart illustrating detection timings at which reflected light is detected.

As illustrated in FIG. 1 and FIG. 2, the light detector 18 is arranged in the frame of the lens 32. The light detector 18 is, for example a photodetector. The light detector 18 detects the reflected light 46 that is the detection light beam 34b reflected by the iris 42. FIG. 5 is a timing chart illustrating detection timings at which the reflected light is detected, and is a diagram for describing detection timings at which the control unit 20 detects the reflected light 46 using the light detector 18. As illustrated in FIG. 5, the control unit 20 detects the reflected light 46 by using the light detector 18 at the timing when causing the light source 12 to emit the detection light beam 34b. This operation enables to know which of the reflected lights 46 of the plurality of the detection light beams 34b is not detected. Ranges may be given to the time during which the reflected light 46 is detected taking into consideration the performance of the light detector 18.

FIG. 1 and FIG. 2 illustrate a case where the light detector 18 is arranged near the center of the lens 32 as an example, but the light detector 18 may be arranged, for example, near the temple 30 of the lens 32 or the nose pads (not illustrated) as long as it can detect the reflected light 46. Even when a plurality of the detection light beams 34b are projected onto the iris 42, since the plurality of the detection light beams 34b are sequentially projected onto the iris 42 as described above, the reflected lights 46 of the plurality of the detection light beams 34b can be detected by the single light detector 18.

A processor such as a CPU (Central Processing Unit) and memories such as a RAM (Random Access Memory) and a ROM (Read Only Memory) function as the control unit 20 and the detection unit 26. The processor and the memories are provided to an external device (e.g., a mobile terminal). The processor functions as the control unit 20 and the detection unit 26 in accordance with the programs stored in the memory. The control unit 20 and the detection unit 26 may be implemented by different processors or the same processor.

The control unit 20 controls the projection unit 24. The control unit 20 causes the light source 12 to emit the image light beam 34a based on input image data and the detection light beam 34b for detecting the position of the pupil 40. Additionally, the control unit 20 controls at least one of optical systems including the light source 12, the first mirror 14, and the like based on the detection result by the light detector 18. For example, the control unit 20 controls the emission of the light beam including the image light beam 34a and/or the detection light beam 34b from the light source 12. For example, the control unit 20 drives the position adjustment unit 22 to move the position of the first mirror 14 and move the positions of the third mirror 17 and the fourth mirror 44 in conjunction with the move of the first mirror 14.

Figure 6A:
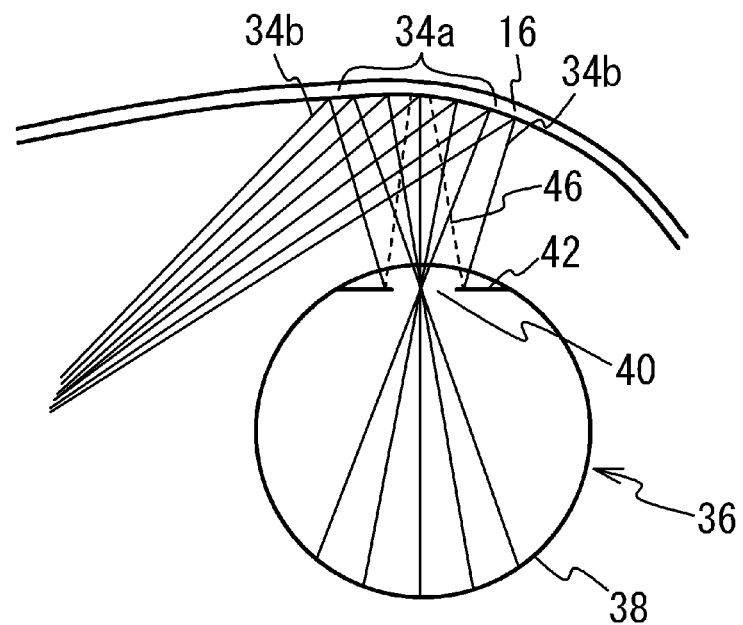
FIG. 6A and FIG. 6B illustrate the projection portion and an eyeball as viewed from above.
Figure 6B:
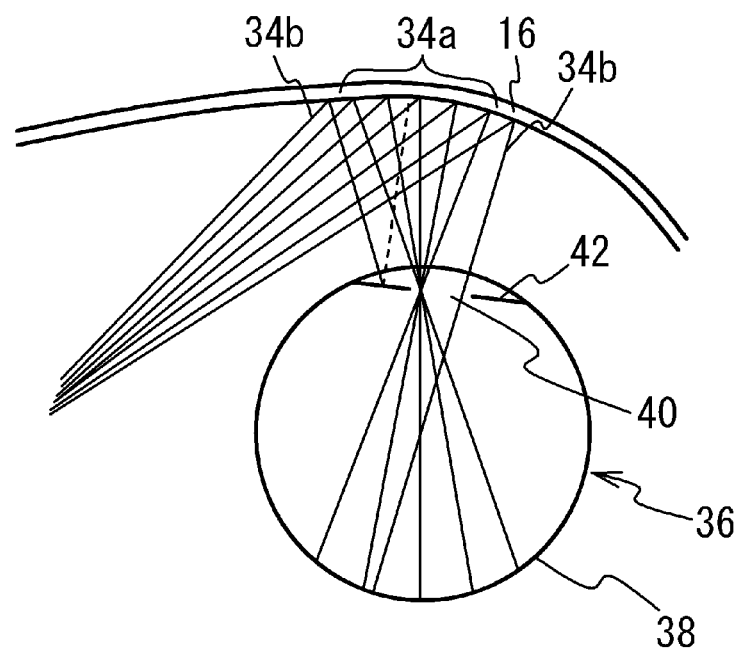

The detection unit 26 detects the direction in which the pupil has moved based on the detection result by the light detector 18. Here, the detection of the reflected light 46 with use of the light detector 18 will be described with FIG. 6A and FIG. 6B. FIG. 6A and FIG. 6B illustrate the projection portion and an eyeball as viewed from above. FIG. 6A illustrates a case where the image light beam 34a passes through the pupil 40 and the detection light beam 34b is projected onto the iris 42. FIG. 6B illustrates a case where one or some of the detection light beams 34b pass through the pupil 40 and are projected onto the retina 38 because of the rotation of the eyeball 36.

As illustrated in FIG. 6A, when the detection light beam 34b is projected onto the iris 42, a relatively large reflected light 46 is generated. On the other hand, when the detection light beam 34b passes through the pupil 40 and is projected onto the retina 38 due to the rotation of the eyeball 36 as illustrated in FIG. 6B, the reflected light 46 is hardly generated. That is, in the case illustrated in FIG. 6A, the light detector 18 detects a relatively large reflected light 46, but in the case illustrated in FIG. 6B, the light detector 18 may not detect the reflected light 46. Thus, when the user has moved the eyeball 36, the light detector 18 does not detect the reflected lights 46 of one or some detection light beams 34b of the plurality of the detection light beams 34b. As described above, the light detector 18 detects the reflected light that is the detection light beam 34b reflected by the eyeball of the user. In FIG. 4, the direction from the position irradiated with the image light beam 34a to the position corresponding to the detection light beam 34b of which the reflected light 46 is not detected corresponds to the direction in which the pupil 40 has moved. Thus, the detection unit 26 detects this direction as the direction in which the pupil 40 has moved relative to the face of the user (i.e., the rotation direction of the eyeball 36). The position of the pupil 40 allows the user's visual line to be known. As clear from the above description, the fact where the light detector 18 does not detect the reflected light 46 means that the light detector 18 does not detect the reflected light 46 having an intensity equal to or greater than a predetermined value. That is, when the intensity of the reflected light 46 detected by the light detector 18 is equal to or less than the predetermined value, the detection unit 26 can determine that the reflected light 46 is not detected.

Figure 7:
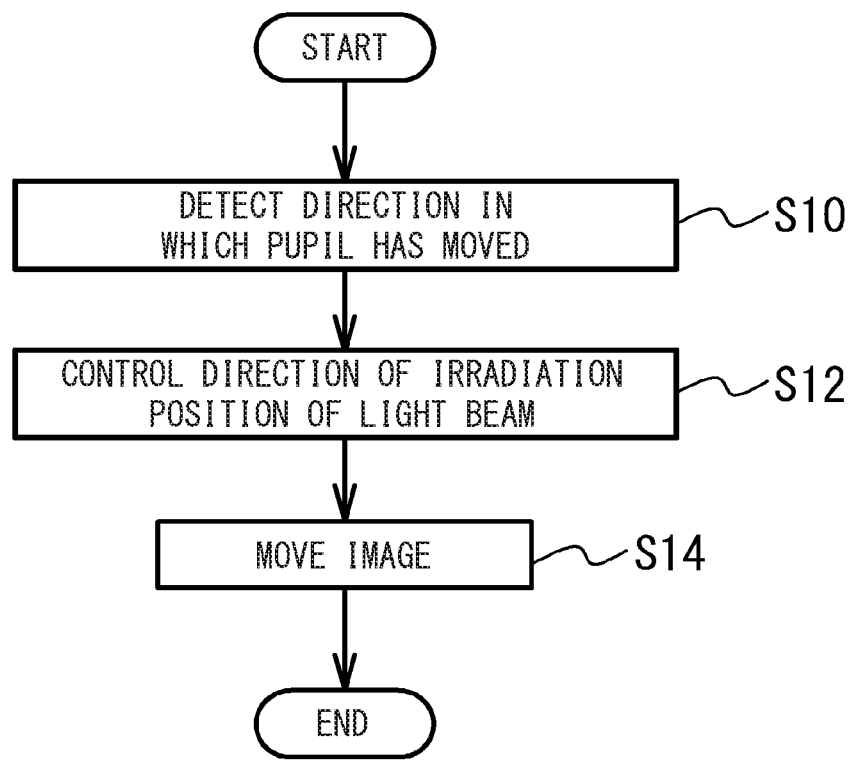
FIG. 7 is a flowchart of an operation of a control unit in the first embodiment.

Operations of the control unit 20 and the detection unit 26 in the first embodiment will be described. FIG. 7 is a flowchart illustrating operations of the control unit 20 and the detection unit 26 in the first embodiment. FIG. 8A through FIG. 8D illustrate the eyeball 36 as viewed from above to describe the movement of the eyeball 36 and the control of the image light beam 34a in the first embodiment. FIG. 9A and FIG. 9B illustrate images projected on the retina 38 in the coordinate system visually recognized by the user in the first embodiment. FIG. 9A illustrates the image before a move of the pupil, and FIG. 9B illustrates the image after the move of the pupil.

Figure 8A:
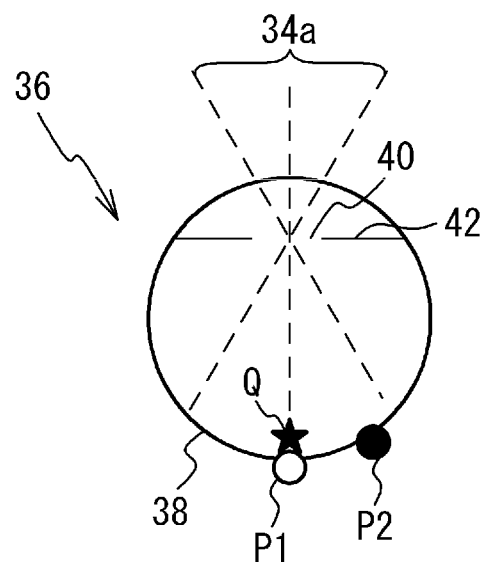
FIG. 8A through FIG. 8D illustrate an eyeball as viewed from above to describe the movement of the eyeball and the control of the image light beam.
Figure 9A:
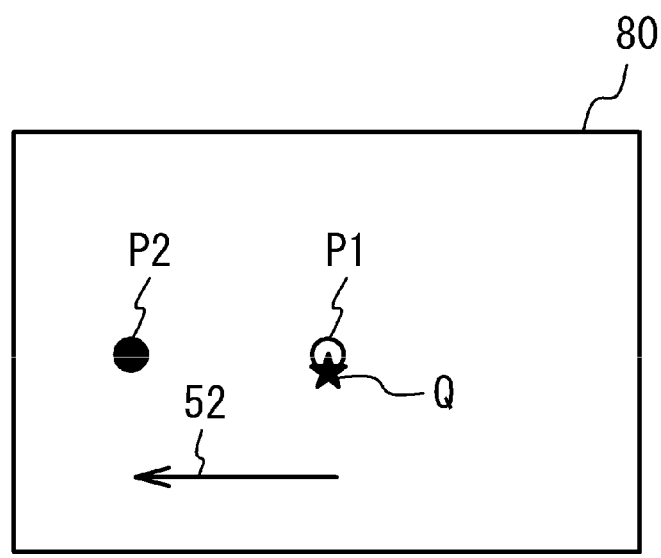
FIG. 9A and FIG. 9B illustrate an image projected on the retina in a coordinate system visually recognized by the user in the first embodiment.
Figure 9B:
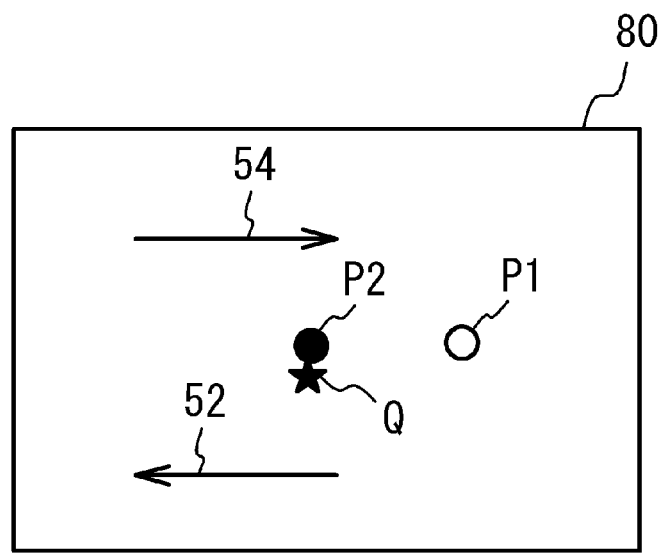

As illustrated in FIG. 8A, before the move of the pupil 40, the control unit 20 controls the projection unit 24 so that the image light beam 34a converges in the pupil 40 and the retina 38 is irradiated with the image light beam 34a. The image light beam 34a is incident from substantially the front of the pupil 40 and passes through substantially the center of the pupil 40. As illustrated in FIG. 9A, in the coordinate system visually recognized by the user (corresponding to the coordinate system in which the user visually recognizes the projection portion 16), a pixel P1 is located at the center of an image 80 (at the position corresponding to the position Q of the retina 38) and a pixel P2 is located in the left part of the image 80. In this case, the position of the user's visual line on the image 80 is the pixel P1. As illustrated in FIG. 8A, the position Q in the retina 38 is irradiated with the image light beam 34a corresponding to the pixel P1. The position located at the right side of the position Q is irradiated with the image light beam 34a corresponding to the pixel P2.

Figure 8B:
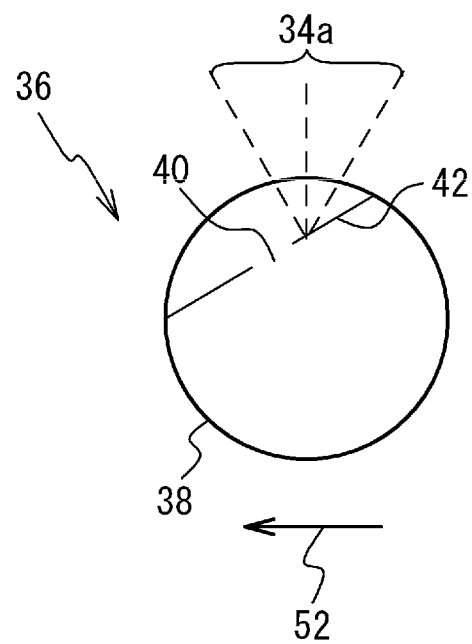

As illustrated in FIG. 7, as the light detector 18 detects the detection light beam, the detection unit 26 detects the direction in which the pupil 40 has moved relative to the face of the user (step S10). As illustrated in FIG. 8B, the pupil 40 has moved to the left 52. The image projection device 100 is fixed to the head of the user by the temple 30. Thus, the pupil 40 moves relative to the head and/or the face of the user. Thus, the iris 42 is irradiated with at least part of the image light beam 34a, and the retina 38 is thus not irradiated with the at least part of the image light beam 34a.

Figure 8C:
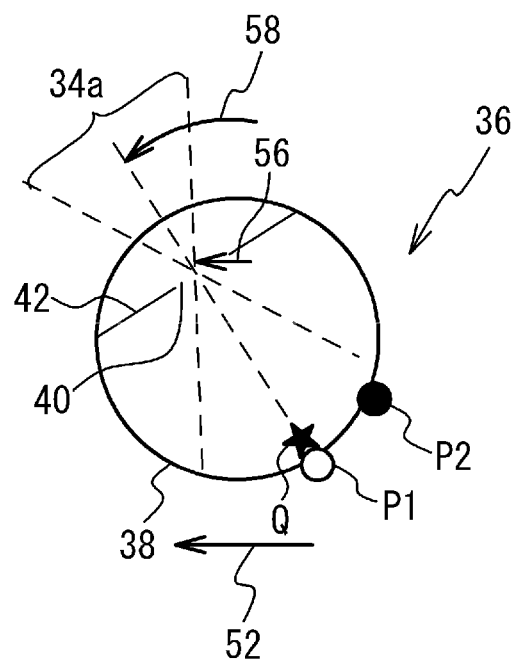

As illustrated in FIG. 7, the control unit 20 controls the projection unit 24 so that the pupil 40 is irradiated with the image light beam 34a (step S12). As illustrated in FIG. 8C, the control unit 20 moves the irradiation position of the image light beam 34a in a direction 52 in which the pupil 40 has moved as indicated by an arrow 56. This operation causes the image light beam 34a to pass through substantially the center of the pupil 40. Furthermore, the control unit 20 tilts the irradiation direction of the image light beam 34a in the direction in which the pupil 40 has moved as indicated by an arrow 58. This operation causes the image light beam 34a to be incident from substantially the front of the pupil 40. The position Q of the retina 38 is irradiated with the pixel P1 of the image 80, and the position at the right side of the position Q is irradiated with the pixel P2. Thus, the user is able to visually recognize the image 80 that is the same as the image before the move of the pupil 40 as illustrated in FIG. 9A.

However, the user expects that the visual line moves to the left part of the image 80 by rotating the eyeball 36 to move the pupil 40. For example the user visually recognizes the pixel P1 in FIG. 9A as the center of the image 80. The user expects to visually recognize the pixel P2 as the center of the image 80 by moving the pupil 40. Accordingly, the user has a feeling of strangeness for the image 80.

Figure 8D:
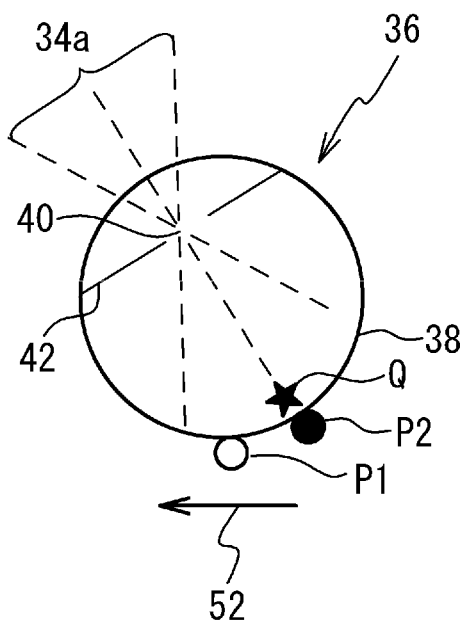

Therefore, as illustrated in FIG. 7, the control unit 20 moves the image 80 (step S14). As illustrated in FIG. 9B, the control unit 20 moves the image 80 in a direction 54 opposite to the direction 52 in which the pupil 40 has moved in the coordinate system visually recognized by the user. This makes the pixel P2 the center of the image 80 and makes the pixel P1 located in the right part of the image 80. As illustrated in FIG. 8D, the center position Q of the retina 38 is irradiated with the image light beam 34a for the pixel P2, and the position at the left side of the position Q is irradiated with the pixel P1. That is, the user's visual line on the image 80 becomes the pixel P2. Accordingly, the user is able to visually recognize the image 80 having the pixel P2 at the center that the user expected to visually recognize. A case where the pupil 40 has moved in the left-right direction has been described above as an example, but the same applies to a case where the pupil 40 has moved in the vertical direction or the diagonal direction. The control unit 20 may execute steps S14 and S12 in this order, or may execute steps S12 and S14 simultaneously.

As described above, in the first embodiment, the projection unit 24 irradiates the pupil 40 of the eyeball 36 of the user with the image light beam 34a forming the image 80 to project the image 80 onto the retina 38 of the eyeball 36. As in step S10 in FIG. 7, the detection unit 26 detects the direction in which the pupil 40 has moved relative to the face of the user. As in step S12, the control unit 20 causes the projection unit 24 to irradiate the pupil 40 with the image light beam 34a based on the detected direction 52 in which the pupil has moved. As described in FIG. 9A and FIG. 9B and step S14 in FIG. 7, the control unit 20 causes the projection unit 24 to move the image 80 in the direction 54 opposite to the direction 52, in which the pupil has moved, with respect to the position onto which the image 80 has been projected before the move of the pupil 40 in the coordinate system visually recognized by the user. This allows the image 80 to be appropriately projected on the retina 38 of the user without bringing a feeling of strangeness to the user.

In addition, as illustrated in FIG. 8C, the control unit 20 moves the position irradiated with the image light beam 34*a* in the direction 52 in which the pupil has moved in the eyeball 36 as indicated by the arrow 56. The control unit 20 tilts the direction in which the image light beam 34*a* enters the eyeball 36 in the direction 52 in which the pupil has moved as indicated by the arrow 58. This allows the retina 38 to be appropriately irradiated with the image light beam 34*a*.

Furthermore, the control unit 20 controls the projection unit 24 so that the pixel P2 at the position of the visual line of the user in the image 80 visually recognized by the user because of the move of the pupil 40 is located at the position Q in the retina 38 irradiated with the pixel P1 that has been at the center portion of the image 80 before the move of the pupil 40. This allows the image 80 to be appropriately projected on the retina 38 of the user without bringing a feeling of strangeness to the user.

In the first embodiment, as illustrated in FIG. 4, the projection unit 24 irradiates the second region, which is distant from the first region irradiated with the image light beam 34*a*, with the detection light beam 34*b* in the eyeball 36 of the user. The detection light beam 34*b* is emitted from the light source 12 from which the image light beam 34*a* is also emitted. The detection unit 26 detects the direction 52 in which the pupil has moved relative to the face of the user based on the detection result of the reflected light that is the detection light beam 34*b* reflected by the eyeball 36 of the user. This allows the detection light beam 34*b* and the image light beam 34*a* to share the optical system such as the light source 12. Thus, the size of the image projection device is reduced.

In the first embodiment, the direction in which the pupil 40 has moved is detected based on the reflected light of the detection light beam 34*b* emitted from the light source 12 from which the image light beam 34*a* is also emitted. The direction in which the pupil 40 has moved may be detected by other methods. For example, the detection light beam 34*b* may be a light such as an infrared light emitted from the light source 12 different from the light source from which the image light beam 34*a* is emitted.

Second Embodiment

A second embodiment is a tangible example of step S12 in FIG. 7. An image projection device in accordance with the second embodiment is the same as the image projection device of the first embodiment illustrated in FIG. 1, and the description thereof is thus omitted. As described above, the control unit 20 drives the position adjustment unit 22 based on the detection result of the reflected light 46 of the detection light beam 34*b* by the light detector 18 to move the position of the first mirror 14 and move the positions of the third mirror 17 and the fourth mirror 44 in conjunction with the move of the first mirror 14. This control moves the origin of the scanning of the image light beam 34*a*. As the origin of the scanning of the image light beam 34*a* moves, the projection positions of the image light beam 34*a* and the detection light beam 34*b* onto the eyeball 36 are moved. This will be described with use of FIG. 10A through FIG. 11.

Figure 10A:
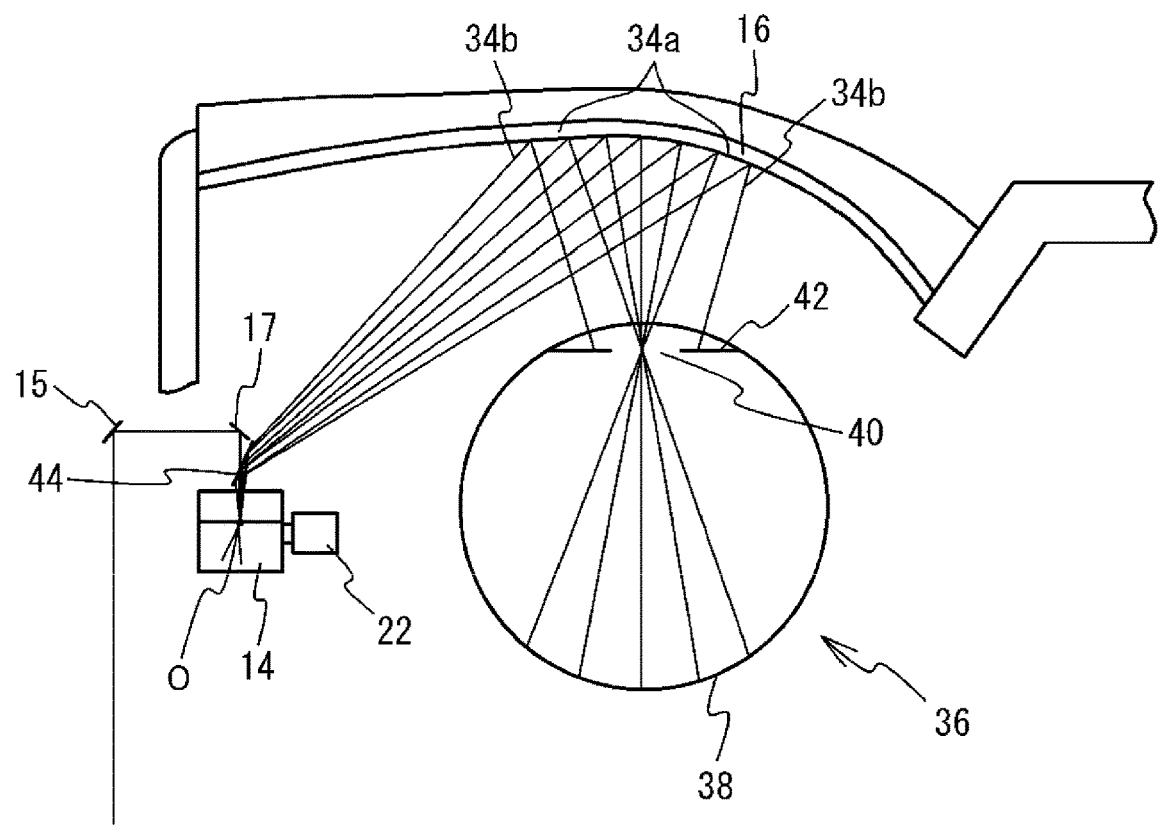
FIG. 10A and FIG. 10B are diagrams for describing the change of projection positions of the image light beam and the detection light beam onto an eyeball.
Figure 10B:
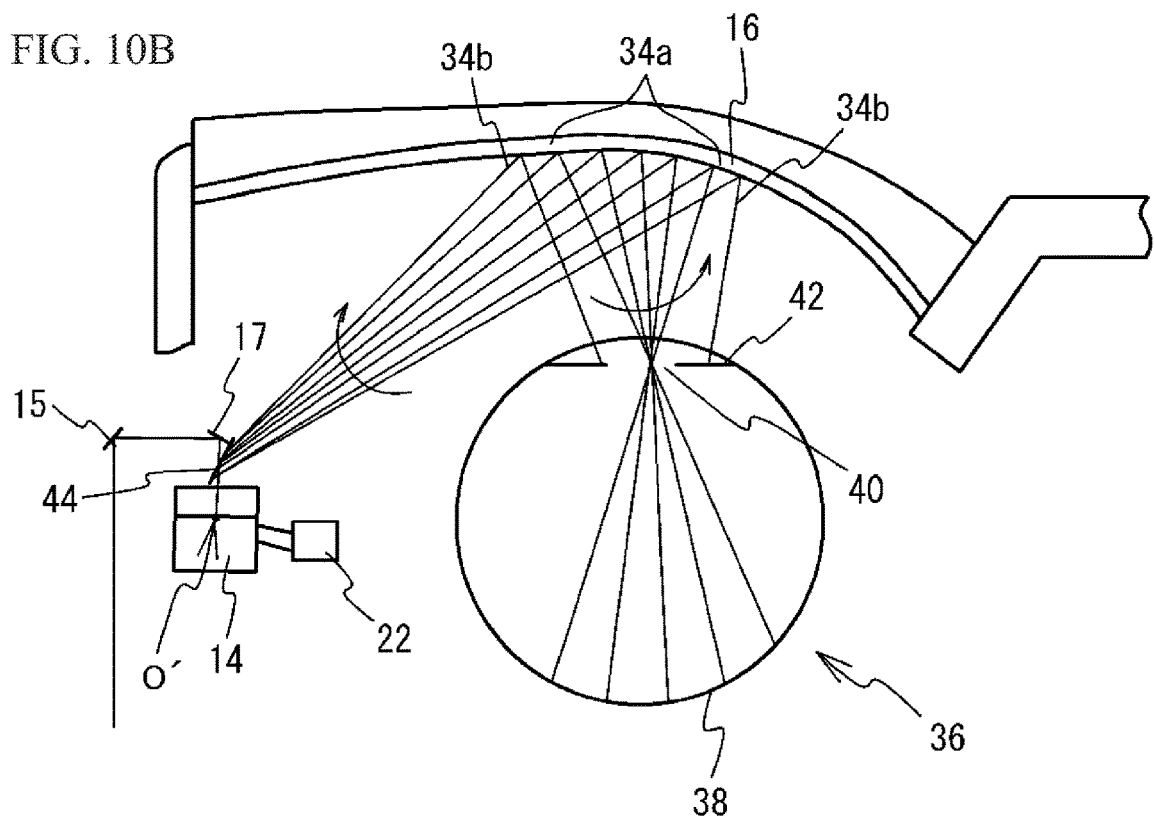
Figure 11:
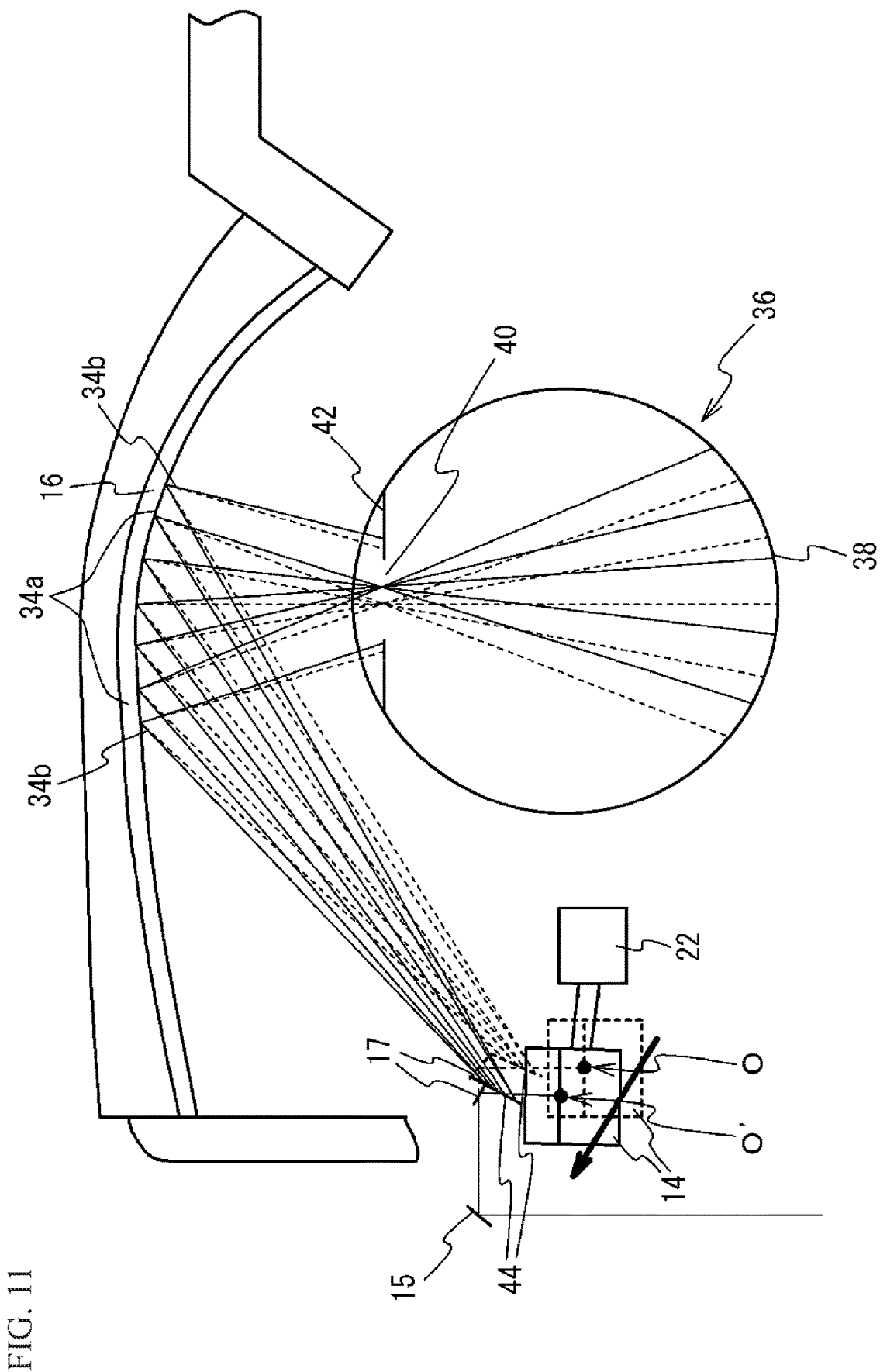
FIG. 11 is a diagram for describing the change of projection positions of the image light beam and the detection light beam onto an eyeball.

FIG. 10A through FIG. 11 are diagrams for describing the change of projection positions of the image light beam 34*a* and the detection light beam 34*b* onto the eyeball 36. FIG. 11 illustrates the state combining the states of FIG. 10A and FIG. 10B, indicates the state of FIG. 10A by dotted lines, and indicates the state of FIG. 10B by solid lines.

The solid lines in FIG. 10A and the dotted lines in FIG. 11 indicate a case where the image light beam 34*a* passes through the vicinity of the center of the pupil 40. When the position adjustment unit 22 is driven to move the position of the first mirror 14 and move the positions of the third mirror 17 and the fourth mirror 44 in conjunction with the move of the first mirror 14 as indicated by the solid lines in FIG. 10B and FIG. 11 from the state indicated by the solid lines in FIG. 10A and the dotted lines in FIG. 11, the origin of the scanning of the image light beam 34*a* is moved from 0 to 0'. Even when the origin of the scanning moves, the incident position of the image light beam 34*a* corresponding to the center part of the image projected onto the retina 38 into the projection portion 16 is configured to be hardly changed. This is to reduce the deterioration of the quality of the image projected onto the retina 38 and the change of the incident position of the detection light beam 34*b* to the projection portion 16.

The move of the origin of the scanning of the image light beam 34*a* described above changes the incident angles of the image light beam 34*a* and the detection light beam 34*b* to the projection portion 16, resulting in the move of the projection positions of the image light beam 34*a* and the detection light beam 34*b* onto the eyeball 36. The image light beam 34*a* and the detection light beam 34*b* move in conjunction with each other while the relative positional relation between the projection positions onto the eyeball 36 remains fixed. For example, the state where the image light beam 34*a* passes through the vicinity of the center of the pupil 40 as indicated by the solid lines in FIG. 10A and the dotted lines in FIG. 11 changes to the state where the image light beam 34*a* passes through a part closer to the edge than the center of the pupil 40 as indicated by the solid lines in FIG. 10B and FIG. 11. As described above, the projection positions of the image light beam 34*a* and the detection light beam 34*b* onto the eyeball 36 can be moved in conjunction with each other by moving the origin of the scanning of the image light beam 34*a* by causing the position adjustment unit 22 to move the position of the first mirror 14 and to move the positions of the third mirror 17 and the fourth mirror 44 in conjunction with the move of the first mirror 14. The first mirror 14 preferably moves in arc, but may linearly move in the direction indicated by arrows in FIG. 10 or the direction perpendicular to the plane of paper in FIG. 10 (the direction perpendicular to the arrow). In this case, a dual-axis actuator (e.g., an ultrasonic actuator) capable of biaxially moving may be used as the position adjustment unit 22.

Third Embodiment

Figure 12A:
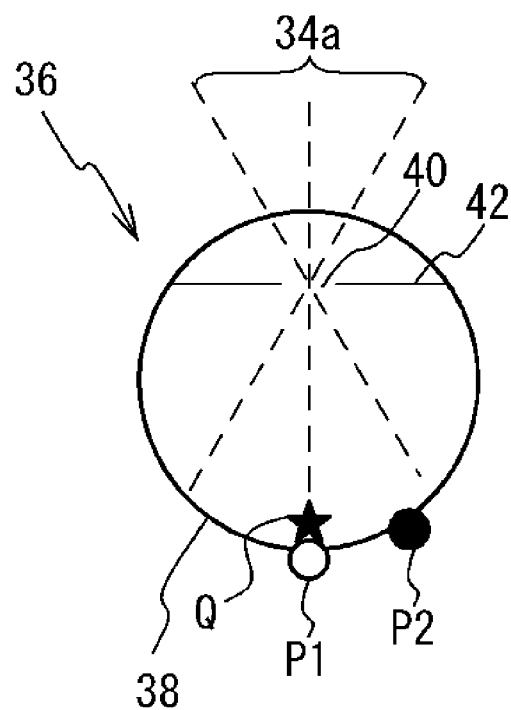
FIG. 12A and FIG. 12B illustrate an eyeball as viewed from above to describe the movement of the eyeball and the control of the image light beam in a third embodiment.
Figure 12B:
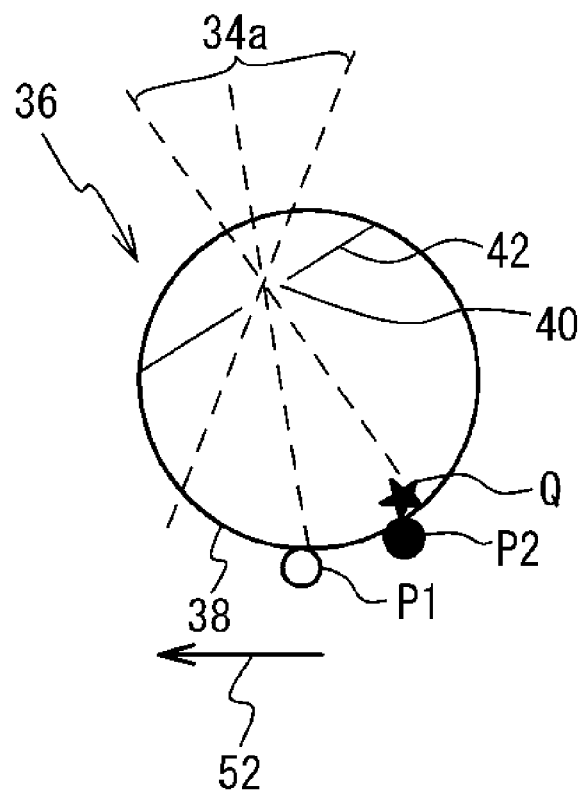
Figure 13:
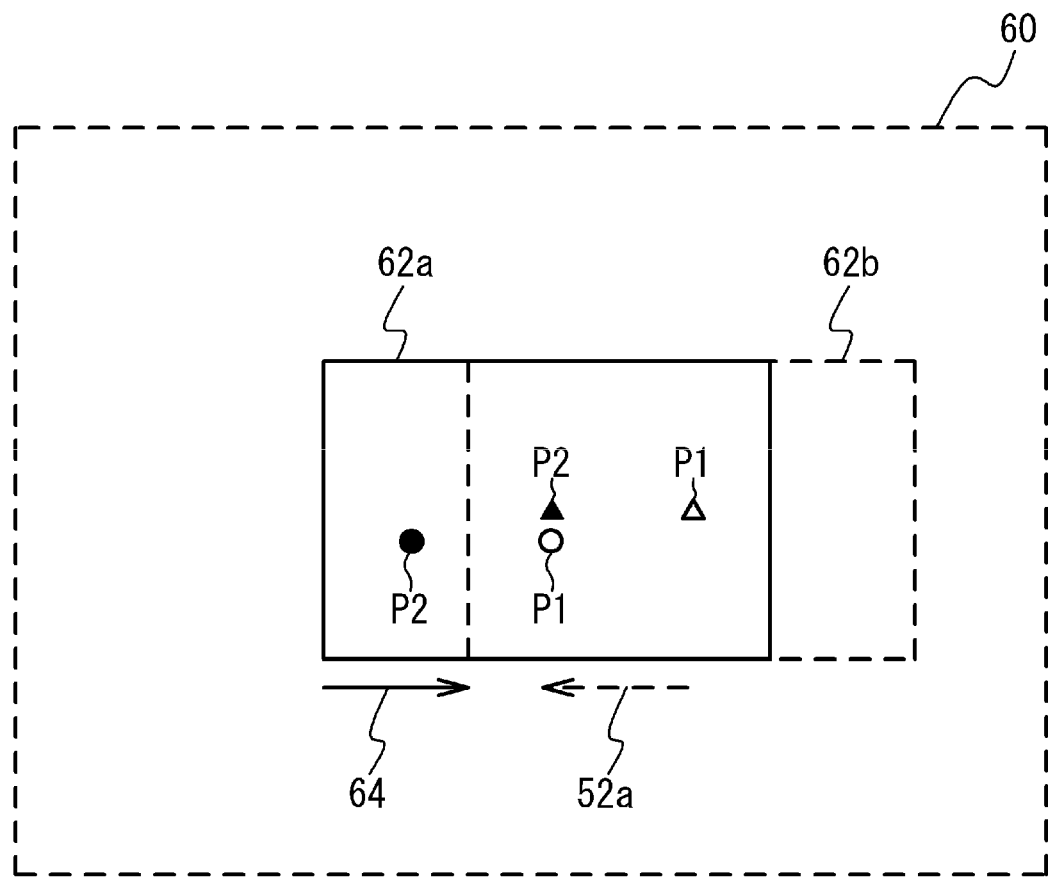
FIG. 13 illustrates a scan area of the first mirror in the third embodiment.

A third embodiment is a tangible example of step S14 in FIG. 7. An image projection device in accordance with the third embodiment is the same as the image projection device of the first embodiment illustrated in FIG. 1, and the description thereof is thus omitted. Hereinafter, operations of the control unit 20 and the detection unit 26 will be described. FIG. 12A and FIG. 12B illustrate the eyeball 36 as viewed from above to describe the movement of the eyeball 36 and the control of the image light beam 34*a* in the third embodiment. FIG. 13 is a diagram illustrating the scan area of the first mirror 14 in the third embodiment. The pixels P1 and P2 within an image area 62a are indicated by circles, and the pixels P1 and P2 within an image area 62b are indicated by triangles.

As illustrated in FIG. 12A, before a move of the pupil 40, the position Q of the retina 38 is irradiated with the image light beam 34a corresponding to the pixel P1, and the position located at the right side of the position Q is irradiated with the image light beam 34a corresponding to the pixel P2. As illustrated in FIG. 13, a scan area 60 corresponds to the area within which the first mirror 14 oscillates in FIG. 3A, and is the coordinate system viewing the image projected onto the projection portion 16 from the side closer to the eyeball 36. The projection portion 16 is not irradiated with a light beam at the timings when the light source 12 does not emit a light beam, but it is illustrated under the assumption that the projection portion 16 is irradiated with a light beam. The image areas 62a and 62b are allowed to be set in desired locations within the scan area 60 by changing the time between the emission of the image light beam 34a from the light source 12 and the scanning of the first mirror 14. When the pupil 40 faces front as illustrated in FIG. 12A, the image area 62a is located in substantially the center of the scan area 60 as illustrated in FIG. 13.

As illustrated in FIG. 12B, as in step S10 in FIG. 7, the detection unit 26 detects that the pupil 40 has moved in the direction 52. As in step S12 in FIG. 7, the control unit 20 controls the projection unit 24 so that the pupil 40 is irradiated with the image light beam 34a. For example, the method of the second embodiment is used. At step S14 in FIG. 7, as illustrated in FIG. 13, the control unit 20 causes the projection unit 24 to move the image area 62a to the image area 62b. A direction 64 in which the image area is moved is opposite to a direction 52a corresponding to the direction in which the pupil has moved. For example, the image area is moved so that the pixel P2 in the image area 62b is located at the position within the scan area 60 at which the pixel P1 has been located in the image area 62a. As illustrated in FIG. 12B, the position Q in the retina 38 is irradiated with the image light beam 34a corresponding to the pixel P2. This causes the visual line on the image visually recognized by the user to be located at the pixel P2, and thereby enables the user to visually recognize the image having the pixel P2 at the center.

In the third embodiment, as illustrated in FIG. 13, the first mirror 14 (a scan unit) scans a light beam emitted from the light source 12, and scans the image light beam 34a so that the image is formed in the image area (a second area) smaller than the scan area (a first area) within which the light beam is able to be scanned. The control unit 20 controls the projection unit 24 so that the image area is moved in the direction 64 opposite to the direction 52a corresponding to the direction in which the pupil has moved in the scan area 60. For example, the control unit 20 moves the image area in the direction opposite to the direction 52a in the coordinate system on the projection portion 16 (a mirror). This control allows the operation at step S14 in FIG. 7. Thus, the image existing in the direction of gaze of the user is projected onto the retina 38.

Fourth Embodiment

Figure 14A:
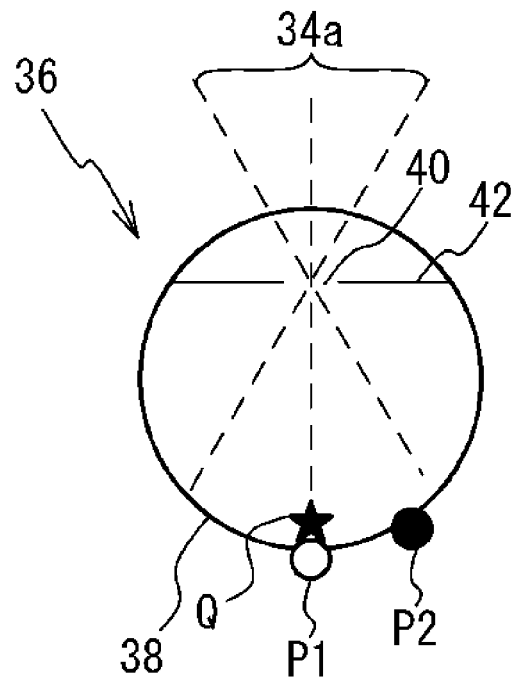
FIG. 14A and FIG. 14B illustrate an eyeball as viewed from above to describe the movement of the eyeball and the control of the image light beam in a fourth embodiment.
Figure 14B:
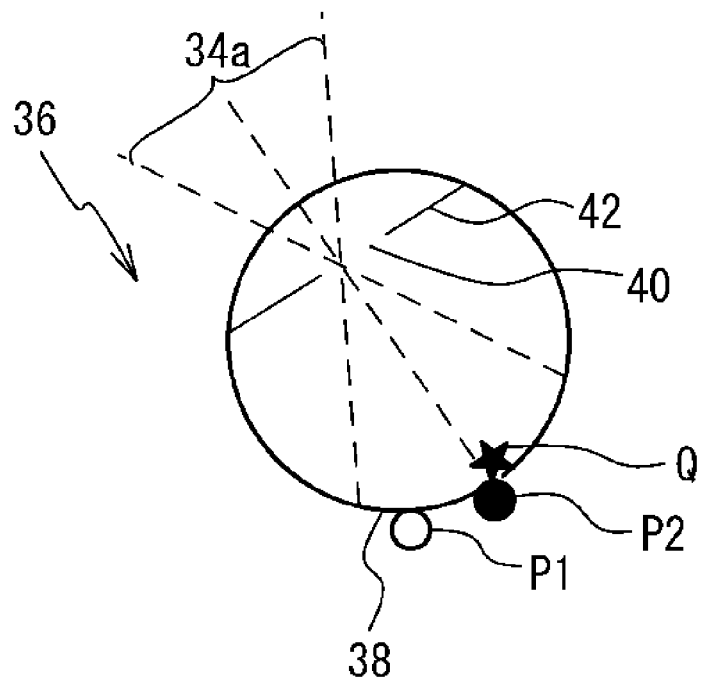
Figure 15:
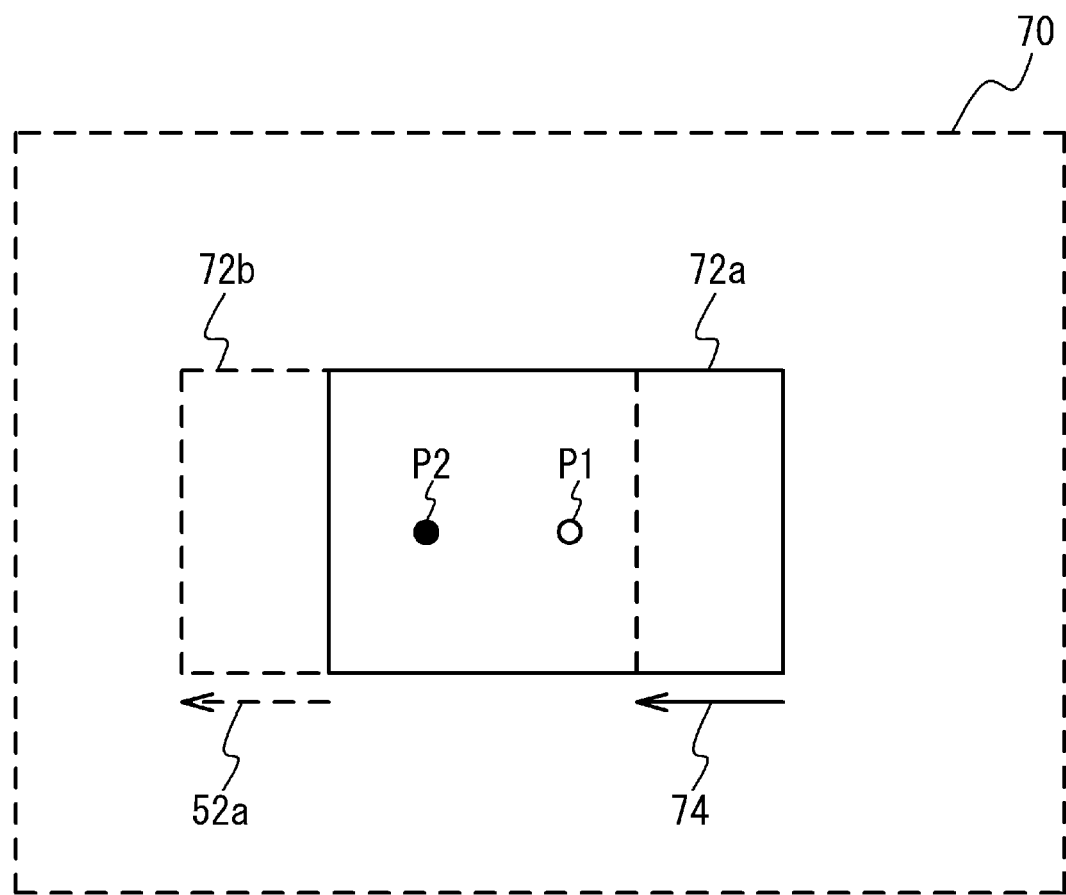
FIG. 15 illustrates an image data area in the fourth embodiment.

A fourth embodiment is another tangible example of step S14 in FIG. 7. An image projection device in accordance with the fourth embodiment is the same as the image projection device of the first embodiment illustrated in FIG. 1, and the description thereof is thus omitted. Hereinafter, operations of the control unit 20 and the detection unit 26 will be described. FIG. 14A and FIG. 14B illustrate an eyeball as viewed from above to describe the movement of the eyeball 36 and the control of the image light beam 34a in the fourth embodiment. FIG. 15 illustrates an image data area 70 in the fourth embodiment.

FIG. 14A is the same as FIG. 12A, and the description thereof is thus omitted. As illustrated in FIG. 15, the image data area 70 is the area of the image data input to the control unit 20. Image areas 72a and 72b are image areas arbitrarily set by the control unit 20 in the image data area 70. As illustrated in FIG. 14A, when the pupil 40 faces front, for example, the image area 72a is located in substantially the center of the image data area 70.

As illustrated in FIG. 14B, as in step S12 in FIG. 7, the control unit 20 controls the projection unit 24 so that the pupil 40 is irradiated with the image light beam 34a. For example, the method of the second embodiment is used. At step S14 in FIG. 7, the control unit 20 moves the image area 72a to the image area 72b as illustrated in FIG. 15. A direction 74 in which the image area is moved is the direction identical to the direction 52a corresponding to the direction in which the pupil 40 has moved. For example, in the image area 72a, the pixel P1 is located at the center. In the image area 72b, the pixel P2 is located at the center. As illustrated in FIG. 14B, the position Q in the retina 38 is irradiated with the image light beam 34a corresponding to the pixel P2. Accordingly, the visual line on the image visually recognized by the user is located at the pixel P2, and the user is thus able to visually recognize the image having the pixel P2 at the center.

In the fourth embodiment, as illustrated in FIG. 15, the projection unit 24 forms an image by image data of the image areas 72a and 72b (second areas) each being smaller than the image data area 70 in the image data of the image data area 70 (a first area). The control unit 20 moves the image area in the direction 74 identical to the direction 52a corresponding to the direction in which the pupil has moved in the image data area. This makes it possible to execute the operation at step S14 in FIG. 7. Thus, the image existing in the direction of gaze of the user is projected on the retina 38.

A case where the image areas 72a and 72b are included in the image data area 70 is described as an example, but a part of the image area 72a and/or 72b may not be necessarily included in the image data area 70. In this case, the part of the image area 72a and/or 72b is not projected onto the retina 38. However, the user does not feel a large sense of discomfort as long as, for example, more than half of the image area 72a and/or 72b is projected on the retina 38.

Fifth Embodiment

Figures 16A, 16B:
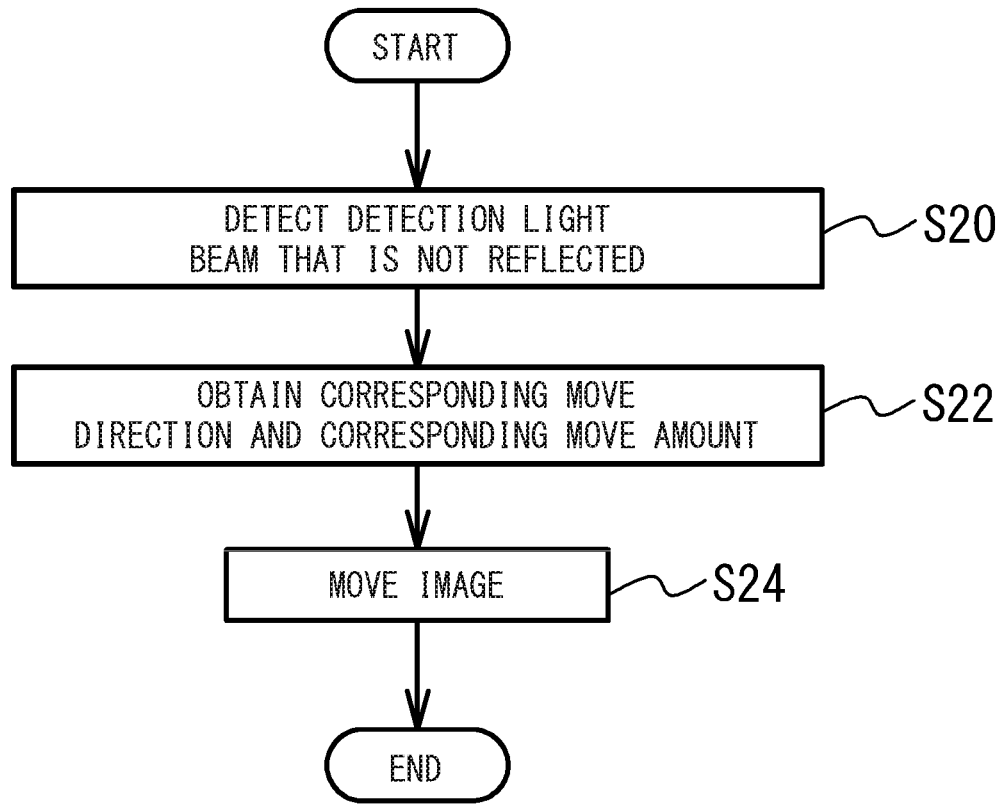
FIG. 16A illustrates a table that the control unit has in a fifth embodiment.
FIG. 16B is a flowchart of operations of the control unit and a detection unit.

FIG. 16A illustrates a table that the control unit has in a fifth embodiment, and FIG. 16B is a flowchart illustrating operations of the control unit and the detection unit. An image projection device in accordance with the fifth embodiment is the same as the image projection device of the first embodiment illustrated in FIG. 1, and the description thereof is thus omitted. Hereinafter, operations of the control unit 20 and the detection unit 26 will be described. As illustrated in FIG. 16A, the direction in which an image is moved and an amount by which the image is moved are predetermined with respect to each of a plurality of the detection light beams 34b. For example, the detection light beams 34b correspond to A and B, the move directions correspond to AA and BB, and the move amounts correspond to aa and bb. The table in FIG. 16A is stored in a memory inside or outside the control unit 20. Positions distant from each other are irradiated with a plurality of the detection light beams 34b as illustrated in FIG. 3A and FIG. 4. The move direction is, for example the direction 54 in FIG. 9B, and the move amount is the amount by which the image is moved in FIG. 9B.

As illustrated in FIG. 16B, the detection unit 26 detects the detection light beam 34b that is not reflected among a plurality of the detection light beams 34b (step S20). It is considered that the pupil 40 is not irradiated with the detection light beam 34b of which the reflected light is not detected. That is, the pupil 40 is located at the position of the detection light beam 34b of which the reflected light is not detected. Thus, the control unit 20 obtains the corresponding move direction and the corresponding move amount from the table in FIG. 16A (step S22). The control unit 20 controls the projection unit 24 so that the image is moved in the obtained move direction by the obtained move amount (step S24). Used as the method of moving the image are, for example, the methods of the third embodiment and the fourth embodiment.

In the fifth embodiment, as illustrated in FIG. 16A, the control unit 20 has movement directions of the image predetermined with respect to a plurality of the detection light beams 34b. As in step S24, the control unit 20 controls the projection unit 24 so that the image is moved in the move direction of the image corresponding to the detection light beam that is not reflected by the eyeball 36 among a plurality of the detection light beams 34b. As described above, by predetermining the move direction of the image with respect to each of the detection light beams 34b, the control of the move of the image is easily executed.

In addition, as illustrated in FIG. 16A, the control unit 20 has move directions of the image and move amounts of the image predetermined with respect to a plurality of the detection light beams 34b. At step S24, the control unit 20 may control the projection unit 24 so that the image is moved in the move direction of the image corresponding to the detection light beam that is not reflected by the eyeball 36 by the move amount of the image corresponding to the detection light beam that is not reflected by the eyeball 36.

The fifth embodiment describes a case where the image is moved in the corresponding move direction by the corresponding move amount when one of a plurality of the detection light beams 34b irradiated to different positions is not detected. For example, when two or more of a plurality of the detection light beams 34b are not detected, it may be assumed that the pupil has moved between the undetected detection light beams 34b, and the image may be moved in the corresponding move direction by the corresponding move amount.

A spectacle-type HMD has been described as an example of the image projection device, but the image projection device may be an image projection device other than an HMD. An example in which an image is projected onto the retina 38 of one of the eyeballs 36, but an image may be projected onto the retinas 38 of both eyeballs 36. The first mirror 14 has been described as an example of the scan unit, but the scan unit may be other devices as long as it can scan a light beam. For example, other components, such as potassium tantalate niobate (KTN) crystals that are electro—optic materials may be used as the scan unit. A laser light has been described as an example of the light beam, but the light beam may be light other than laser light.

Although the embodiments of the present invention has been described in detail, the present invention is not limited to a certain embodiment, and it should be understood that the various change, substitutions, and alterations could be made hereto without departing from the scope of the invention.

DESCRIPTION OF LETTERS OR NUMERALS 10 temple
12 light source
14 first mirror
18 light detector
20 control unit
22 position adjustment unit
24 projection unit
26 detection unit
36 eyeball
38 retina
40 pupil
42 iris
34a image light beam
34b detection light beam

The invention claimed is:

1. An image projection device comprising:
a projection unit that irradiates a pupil of an eyeball of a user with an image light beam forming an image to project the image onto a retina of the eyeball;
a detection unit that detects a direction in which the pupil has moved relative to a face of the user; and
a control unit that controls the projection unit based on a detected direction in which the pupil has moved so that the pupil is irradiated with the image light beam and moves the image in a direction opposite to the direction in which the pupil has moved with respect to a position on which the image has been projected before a move of the pupil in a coordinate system visually recognized by the user.

2. The image projection device according to claim 1, wherein
the control unit irradiates the pupil with the image light beam by moving a position irradiated with the image light beam in the eyeball in the direction in which the pupil has moved and tilting a direction in which the image light beam enters the eyeball in the direction in which the pupil has moved.

3. The image projection device according to claim 1, wherein
the control unit controls the projection unit so that a position of a visual line of the user in the image visually recognized by the user due to the move of the pupil is located at a position in the retina at which a center position of the image before the move of the pupil is located.

4. The image projection device according to claim 1, wherein
the projection unit includes a light source emitting the image light beam, and a scan unit that scans a light beam emitted from the light source and scans the image light beam so that the image is formed in a second area smaller than a first area within which the light beam is able to be scanned, and
the control unit controls the projection unit so that the second area is moved in a direction opposite to a direction corresponding to the direction in which the pupil has moved within the first area.

5. The image projection device according to claim 4, wherein
the projection unit includes a mirror that is located in front of the eyeball and reflects the image light beam scanned by the scan unit to the pupil, and the control unit controls the projection unit so that the second area is moved in the direction opposite to the direction corresponding to the direction in which the pupil has moved within the first area in a coordinate system on the mirror.

6. The image projection device according to claim 1, wherein
the projection unit forms the image with image data of a second area smaller than a first area in image data of the first area, and
the control unit controls the projection unit so that the second area is moved in a direction corresponding to the direction in which the pupil has moved within the first area.

7. The image projection device according to claim 1 wherein
the projection unit emits a detection light beam emitted from a light source, from which the image light beam is also emitted, to a second region distant from a first region irradiated with the image light beam in the eyeball of the user, and
the detection unit detects the direction in which the pupil has moved relative to the face of the user based on a detection result of a reflected light that is the detection light beam reflected by the eyeball of the user.

8. The image projection device according to claim 7, wherein
the projection unit emits a plurality of detection light beams to positions located away from each other, and
the control unit has move directions of the image predetermined with respect to the plurality of detection light beams, and controls the projection unit so that the image is moved in a move direction of the image corresponding to a detection light beam not reflected by the eyeball among the plurality of detection light beams.

9. The image projection device according to claim 8, wherein
the control unit has move directions and move amounts of the image predetermined with respect to the plurality of detection light beams, and controls the projection unit so that the image is moved in a move direction of the image corresponding to a detection light beam not reflected by the eyeball among the plurality of detection light beams by a move amount of the image corresponding to the detection light beam not reflected by the eyeball.

10. The image projection device according to claim 1, wherein the control unit moves the image in a direction corresponding to the direction in which the pupil has moved with respect to a position on which the image has been projected before a move of the pupil in a coordinate system on the retina.

11. The image projection device according to claim 1, wherein the control unit irradiates the pupil with the image light beam by moving a position irradiated with the image light beam in the eyeball in the direction in which the pupil has moved and tilting an incident direction in which the image light beam enters the eyeball against the face in the direction in which the pupil has moved such that an origin of the incident direction moves in the direction in which the pupil has moved.

* * * * *